United States Patent
Luzius et al.

(10) Patent No.: US 10,245,677 B2
(45) Date of Patent: Apr. 2, 2019

(54) LASER DECOATING OF COATED METAL SHEETS

(71) Applicant: TRUMPF Laser- und Systemtechnik GmbH, Ditzingen (DE)

(72) Inventors: Severin Luzius, Stuttgart (DE); Florian Kiefer, Gerlingen (DE)

(73) Assignee: TRUMPF Laser- und Systemtechnik GmbH, Ditzingen (DE)

(*) Notice: Subject to any disclaimer, the term of this patent is extended or adjusted under 35 U.S.C. 154(b) by 734 days.

(21) Appl. No.: 14/450,419

(22) Filed: Aug. 4, 2014

(65) Prior Publication Data

US 2015/0034615 A1    Feb. 5, 2015

(30) Foreign Application Priority Data

Aug. 5, 2013  (DE) ........................ 10 2013 215 346

(51) Int. Cl.
*B23K 26/08* (2014.01)
*B23K 26/26* (2014.01)
(Continued)

(52) U.S. Cl.
CPC ........ *B23K 26/0876* (2013.01); *B23K 26/142* (2015.10); *B23K 26/26* (2013.01); *B23K 26/352* (2015.10); *B23K 26/354* (2015.10); *B23K 26/60* (2015.10); *B23K 37/0235* (2013.01); *B23K 37/0408* (2013.01); *B23K 2101/185* (2018.08);
(Continued)

(58) Field of Classification Search
CPC . B60P 7/15; B65D 19/44; B65D 2519/00278; B65D 2519/00532; B65D 2519/0082; B65D 2585/6887; B65D 25/105; B65D 85/68; F16B 2/22; F16B 2/245; Y10T 24/44615; Y10T 24/44624; Y10T 24/44752; B23K 2201/185; B23K 2201/34; B23K 2203/08; B23K 26/0066; B23K 26/0081; B23K 26/0876;
(Continued)

(56) References Cited

U.S. PATENT DOCUMENTS

| 5,889,253 A * | 3/1999 | Kanaoka | B23K 26/40 219/121.61 |
| 8,772,671 B2 * | 7/2014 | Broude | B23K 26/032 219/121.62 |
| 2008/0271733 A1 * | 11/2008 | Ng | B23K 26/384 128/200.23 |

FOREIGN PATENT DOCUMENTS

JP         07100679 A      4/1995

OTHER PUBLICATIONS

English translation of JP 7100679.*
English Language Translation of JP 7100679 (Year: 1995).*

* cited by examiner

*Primary Examiner* — Dana Ross
*Assistant Examiner* — Joseph W Iskra
(74) *Attorney, Agent, or Firm* — Fish & Richardson P.C.

(57) ABSTRACT

Methods, devices and systems for laser decoating of coated metal sheets, in particular for removing a metal protective layer from a metal sheet by a laser beam. The laser beam is directed onto a surface of a metal sheet coated with a metal protective layer, such that the laser beam strikes the surface of the metal sheet at a laser spot and melts material of the metal protective layer. A gas is directed by a plurality of nozzles at a pressure of at least 3 bar and at an acute angle with respect to the laser beam onto the laser spot. The nozzles are arranged around the laser beam such that the gas directed from the nozzles blows away the melted material of the metal protective layer from the metal sheet.

20 Claims, 2 Drawing Sheets

(51) Int. Cl.
*B23K 26/60* (2014.01)
*B23K 37/02* (2006.01)
*B23K 37/04* (2006.01)
*B23K 101/18* (2006.01)
*B23K 101/34* (2006.01)
*B23K 103/04* (2006.01)
*B23K 103/08* (2006.01)
*B23K 26/142* (2014.01)
*B23K 26/352* (2014.01)
*B23K 26/354* (2014.01)

(52) U.S. Cl.
CPC ...... *B23K 2101/34* (2018.08); *B23K 2103/04* (2018.08); *B23K 2103/08* (2018.08)

(58) Field of Classification Search
CPC ...... B23K 26/142; B23K 26/26; B23K 26/60; B23K 37/0235; B23K 37/0408
USPC .................................................. 219/121.66
See application file for complete search history.

LASER DECOATING OF COATED METAL SHEETS

CROSS REFERENCE TO RELATED APPLICATION

This application claims priority under 35 U.S.C. § 119 to German Application No. DE 10 2013 215 346.5 filed on Aug. 5, 2013. The content of this priority application is hereby incorporated by reference in its entirety.

TECHNICAL FIELD

This specification relates to laser decoating of coated metal sheets, in particular for removing a metal protective layer from a metal sheet by a laser beam.

BACKGROUND

During hot-forming of steel, an aluminum/silicon coating protects the steel surface from scaling or corrosion. This coating does not evaporate during the laser welding and therefore results in weak locations in the weld seam. In order to counteract this, coated components, in particular, custom-made metal plates (so-called tailored blanks or hotforming blanks) are previously decoated using a pulsed solid-state laser which removes a 0.5 to 4 mm wide strip of the coating along a subsequent weld seam. The weld seam thus becomes stronger, and the component can be readily used in hot forming. However, the advance speed, at which the laser beam is moved over the metal sheet is relatively slow so that the coating is removed in a reliable manner. It is also known during the laser decoating operation to additionally use brushes, which brush the surface of the metal sheet in the advance direction behind the laser beam. On the whole, however, laser decoating has until now been possible only in a very inefficient manner.

SUMMARY

One aspect of the invention features a method of laser decoating of coated metal sheets. The method includes directing a laser beam onto a surface of a metal sheet coated with a metal protective layer, such that the laser beam strikes the surface of the metal sheet at a laser spot and melts material of the metal protective layer; and directing, by a plurality of nozzles, a gas at a pressure of at least 3 bar and at an acute angle with respect to the laser beam onto the laser spot, the nozzles being arranged around the laser beam such that the gas directed from the nozzles blows away the melted material of the metal protective layer from the metal sheet. The method can achieve high advance speeds and nonetheless remove the metal protective layer in a reliable manner.

In contrast to known laser decoating methods, in which the coating is removed without gas, owing to the use of a plurality of nozzles which direct the compressed air or an inert gas (e.g., nitrogen) in a selective manner onto the laser spot located on the surface of the metal sheet, the effectiveness of the process is considerably increased. Tests have shown that—compared with the known laser decoating methods—the advance speed of the laser beam can be at least doubled as a result of the use of the supplied gas. Furthermore, the depth of the layer removal can be adjusted in a much more precise manner since, in contrast to the conventional method, the coating is melted and blown away by means of the nozzles. Owing to the adjustment of the energy per unit length introduced (laser power divided by the advance speed), the depth of the melting and consequently the thickness of the removed layer can be controlled in a precise manner. Furthermore, a higher melting point of the base material, e.g., in the case of AlSi coatings on Usibor steel, may prevent it from melting. In the conventional method, the coating evaporates, but with a molten mass always being produced. The base material and coating react in a similar manner to this process. The adjustment of the depth of the layer removal has the advantage that it can be determined whether or not the intermetallic phase between the coating and carrier material should be removed. The laser beam may strike the metal sheet surface perpendicularly or at an angle. The adaptation of further laser parameters to the process similarly contributes to an increase of the effectiveness.

In some implementations, the nozzles are all orientated precisely onto the laser spot with a spacing of a few millimeters in order to achieve the most localized and rapid flow possible. The removal process can be used in order to remove, over an at least 1 mm wide strip along a planned weld seam, the aluminum/silicon protective coating from "tailored blanks" or "hotforming blanks" which are thereby rendered weldable. However, this removal method can also be used with any other coated component (e.g., zinc-coated metal sheet, etc.).

In some implementations, at least one of the nozzles directs the gas onto the laser spot exclusively with flow components in the direction of the laser beam and in the advance direction of the laser beam. In a preferred configuration, the laser processing head includes three nozzles, and only the central nozzle directs the gas onto the laser spot exclusively with flow components in the direction of the laser beam and in the advance direction of the laser beam. The two outer nozzles can advantageously each direct the gas onto the laser spot symmetrically relative to the plane defined by the laser beam and the advance direction, preferably each offset through an angle of approximately 45 degrees with respect to the inert gas being discharged from the central nozzle.

The nozzles can be intended to be spaced apart from the metal sheet surface by a maximum of from 5 to 8 mm in order to achieve the most localized and rapid flow possible at the laser spot.

Another aspect of the invention features a laser decoating device including a laser beam generation unit for generating a laser beam and a laser processing head from which the laser beam is emitted. The laser processing head includes a plurality of nozzles which are arranged around the emitted laser beam and whose nozzle axes are each directed at an acute angle with respect to the laser beam onto the same intersection location with the emitted laser beam. The opening diameter of the nozzles is preferably a maximum of 2.5 mm. The laser processing head or the laser beam can be moved relative to the metal sheet or, however, the metal sheet can be moved relative to the laser processing head or the laser beam.

Advantageously, the plurality of nozzles is arranged on a common nozzle member, which either has a separate gas connection for each nozzle or has a common gas connection for all the nozzles.

In a preferred configuration, the laser processing head has at least three nozzles, the two outer nozzles each being arranged symmetrically with respect to the plane defined by the laser beam and the nozzle axis of the central nozzle, in particular in each case offset through an angle of approximately 45 degrees with respect to the central nozzle. The number and arrangement of the nozzles determine in this instance the direction of the molten mass which has been blown away.

Other advantages of the invention will be appreciated from the claims, the description and the drawings. The features mentioned above and those set out below may also be used individually per se or together in any combination. The embodiment shown and described is not intended to be understood to be a conclusive listing but is instead of exemplary character for describing the invention.

DETAILED DESCRIPTION

Figure 1:
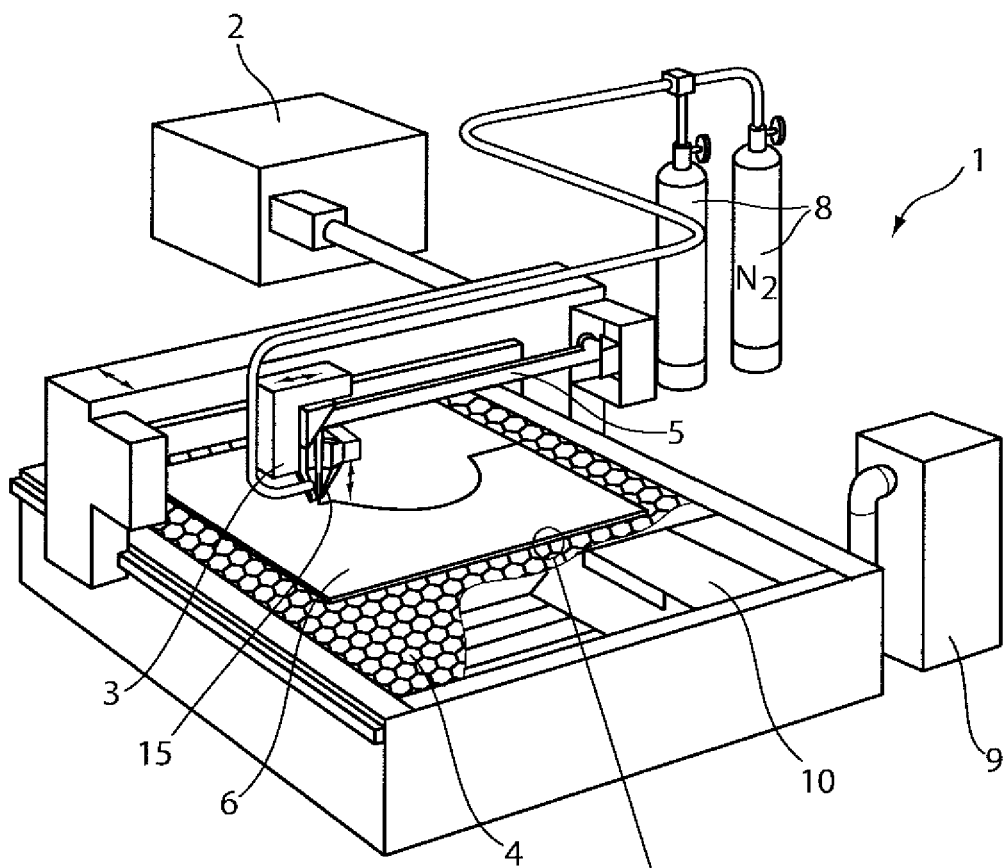
FIG. 1 shows a laser decoating device for carrying out a laser decoating method according to the invention.
Figure 1:
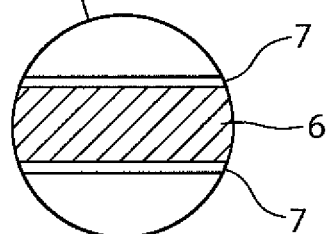

A laser decoating device 1 which is illustrated in perspective in FIG. 1 includes a laser, e.g., a $CO_2$ laser, a fiber laser, a diode laser or solid-state laser, as a laser beam generation unit 2, a movable laser processing head 3, and a workpiece support 4. In the laser beam generation unit 2, a laser beam 5 is generated which is guided by means of a fiber optic cable (not shown) or redirection mirrors (not shown) from the laser 2 to the processing head 3. There is arranged on the workpiece support 4 as a workpiece a metal sheet (tailored blank or hotforming blank) 6 which is coated at both sides with an aluminum/silicon layer 7. The laser beam 5 is directed onto the metal sheet 6 by means of a focusing optics which is arranged in the processing head 3. The laser decoating device 1 is further supplied with compressed air or inert gas 8, for example, nitrogen. Alternatively or in addition, compressed air or application-specific gases may also be provided. The use of the individual gases is dependent on the material of the metal sheet 6 to be processed, on the coating to be removed and on quality requirements. There is further provided a suction device 9, which is connected to a suction channel 10 located below the workpiece support 4.

Figure 2A:
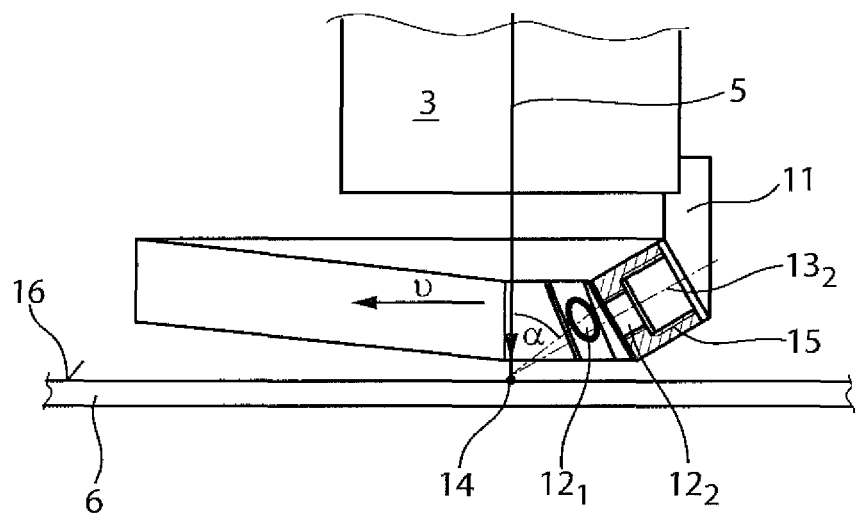
FIGS. 2a, 2b are a side view (FIG. 2a) and a plan view (FIG. 2b) of three nozzles which are secured to a laser processing head, respectively.
Figure 2B:
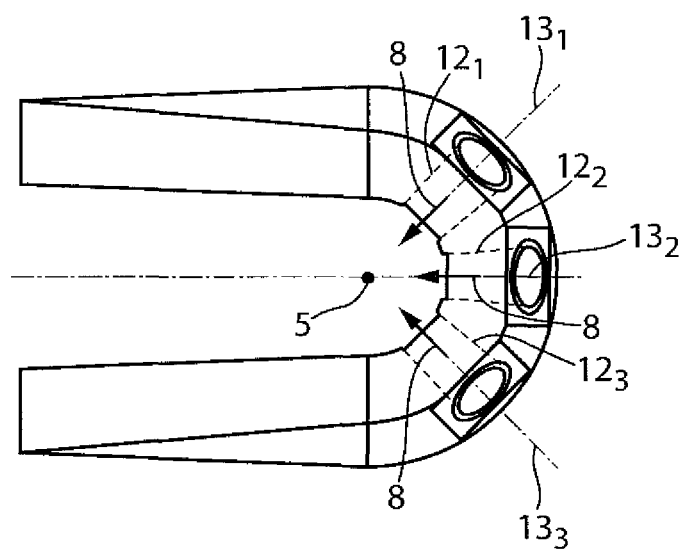

As shown in FIGS. 2a and 2b, there are secured to the processing head 3 by means of a retention member 11 three nozzles $12_1$-$12_3$ which have an opening diameter of a maximum of 2.5 mm and from which the inert gas 8 is discharged at a high pressure of at least 3 bar. The nozzles $12_1$-$12_3$ are arranged around the emitted laser beam 5, in particular in the form of a quarter-circle with identical angular spacings of 45 degrees, the nozzle axes $13_1$-$13_3$ all being orientated at an acute angle α with respect to the laser beam 5 and intersecting the emitted laser beam 5 at the same intersection location 14. The two outer nozzles $12_1$, $12_3$ are arranged in a mirror-symmetrical manner relative to each other with respect to the plane defined by the laser beam 5 and the nozzle axis $13_2$ of the central nozzle $12_2$. In the embodiment shown, the nozzles $12_1$-$12_3$ are constructed in a common nozzle member 15, but each with their own gas connection, but they may also have individual nozzle members which are separate from each other.

In order to remove the aluminum/silicon layer 7, the laser beam 5 is moved in an advance direction v over the metal sheet 6, the processing head 3 being located with such spacing from the metal sheet 6 that the intersection location 14 is located on the surface 16 of the metal sheet. Of course, the metal sheet 6 can also equally well be moved relative to the laser beam 5. By means of the nozzles $12_1$-$12_3$ which are arranged around the laser beam 5, the inert gas 8 is in each case directed at a pressure of at least 3 bar and at the acute angle α onto the intersection location 14, that is to say, onto the laser spot 14 on the metal sheet surface 16. The central nozzle $12_2$ directs the inert gas 8 onto the laser spot 14 exclusively with flow components in the direction of the laser beam 5 and in the advance direction v. The two external nozzles $12_1$, $12_3$ direct the inert gas 8 onto the laser spot 14 in each case symmetrically relative to the plane defined by the laser beam 5 and the advance direction v. The nozzles $12_1$-$12_3$ are therefore all directed precisely onto the laser spot 14 with a spacing of a few millimeters in order to achieve the most localized and rapid flow possible of the inert gas 8 at the laser spot 14. In the region of the removed aluminum/silicon layer 7, the metal sheet 6 is now made weldable.

A number of embodiments of the invention have been described. Nevertheless, it will be understood that various modifications may be made without departing from the spirit and scope of the invention. Accordingly, other embodiments are within the scope of the following claims.

What is claimed is:

1. A method of laser decoating a coated metal sheet, the method comprising:
   directing a laser beam onto a surface of a metal sheet coated with a metal protective layer, such that the laser beam strikes the surface of the metal sheet at a laser spot and melts material of the metal protective layer; and
   directing multiple gas flows, from a plurality of nozzles at a pressure of at least 3 bar and at an acute angle with respect to the laser beam onto the laser spot, the nozzles being arranged around the laser beam such that the gas flows directed from the nozzles intersect with each other on the surface of the workpiece at the laser spot and blow away the melted material of the metal protective layer from the metal sheet.

2. The method of claim 1, further comprising:
   moving the laser beam relative to the metal sheet in an advance direction and at an advance speed over the metal sheet, to remove material of the metal protective layer from the metal sheet along the advance direction.

3. The method of claim 2, wherein at least one of the nozzles directs the gas onto the laser spot exclusively with flow components in the direction of the laser beam and in the advance direction.

4. The method of claim 2, wherein directing the gas comprises directing the gas onto the laser spot from at least three nozzles, the gas from each nozzle exiting from a pressure of at least 3 bar and at an acute angle with respect to the laser beam, and
   wherein only a central nozzle of the nozzles directs the gas onto the laser spot exclusively with flow components in the direction of the laser beam and in the advance direction of the laser beam.

5. The method of claim 4, wherein two outer nozzles of the nozzles each direct the gas onto the laser spot symmetrically with respect to a plane defined by the laser beam and the advance direction.

6. The method of claim 5, wherein the two outer nozzles each direct the gas onto the laser spot in an angularly offset manner through approximately 45 degrees with respect to the gas flowing out of the central nozzle.

7. The method of claim 2, further comprising:
   adjusting the advance speed of moving the laser beam to control a depth of melt of the protective layer.

8. The method of claim 7, further comprising:
determining, based on a thickness of the metal protection layer after the melted material has been blown away, whether an intermetallic phase between a coating material and a carrier material of the metal protective layer has been removed.

9. The method of claim 1, further comprising:
drawing the gas by a suction device connected to a suction channel located below a workpiece support for the coated metal sheet.

10. The method of claim 1, wherein the nozzles are each spaced from the surface of the metal sheet no more than about 5 to 8 mm.

11. The method of claim 1, wherein the laser beam strikes the surface of the metal sheet perpendicularly.

12. The method of claim 1, wherein the metal protective layer includes at least one of aluminum/silicon protective coating and zinc protective coating.

13. The method of claim 1, wherein the gas is either compressed air or an inert gas.

14. The method of claim 1, wherein the nozzles have an opening diameter of no more than about 2.5 mm, from which the gas is discharged at the pressure of at least 3 bar.

15. A laser decoating device, comprising:
a laser beam generation unit for generating a laser beam; and
a laser processing head, from which the laser beam is emitted,
wherein the laser processing head has a plurality of nozzles arranged around the emitted laser beam and whose nozzle axes are each directed at an acute angle with respect to the laser beam and configured to direct a gas to intersect with the emitted laser beam at a surface of a workpiece coated with a protective layer,
wherein the laser processing head is configured to direct the laser beam to strike the surface of the workpiece at a laser spot and melts material of the protective layer, and
wherein the plurality of nozzles is configured to direct the gas at a pressure of at least 3 bar onto the laser spot such that the gas directed from the nozzles blows away the melted material of the protective layer from the workpiece.

16. The laser decoating device of claim 15, wherein the plurality of nozzles are arranged on a common nozzle member.

17. The laser decoating device of claim 15, wherein the laser processing head has at least three nozzles, the two outer nozzles being arranged in a mirror-symmetrical manner relative to each other with respect to a plane defined by the laser beam and the nozzle axis of the central nozzle.

18. The laser decoating device of claim 17, wherein the two outer nozzles are each arranged in a manner offset through an angle of approximately 45° with respect to the central nozzle.

19. The laser decoating device of claim 15, wherein an opening diameter of the nozzles is a maximum of about 2.5 mm.

20. The laser decoating device of claim 15, further comprising a suction device connected to a suction channel located below a workpiece support for a coated metal sheet, the suction device configured to draw the gas through the suction channel during operation of the laser decoating device.

* * * * *